United States Patent
Yeo et al.

(10) Patent No.: US 8,891,429 B2
(45) Date of Patent: Nov. 18, 2014

(54) METHOD AND APPARATUS FOR DETERMINING NUMBER OF IDLE STATE TERMINALS AND METHOD FOR CONTROLLING DATA TRANSMISSION USING THE SAME

(75) Inventors: Geon Min Yeo, Daejeon (KR); Young Il Kim, Daejeon (KR); Won Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 132 days.

(21) Appl. No.: 13/570,932

(22) Filed: Aug. 9, 2012

(65) Prior Publication Data

US 2013/0223244 A1 Aug. 29, 2013

(30) Foreign Application Priority Data

Feb. 28, 2012 (KR) .......................... 10-2012-0020164

(51) Int. Cl.
*H04H 20/71* (2008.01)

(52) U.S. Cl.
USPC ............................ 370/312; 370/324; 370/252

(58) Field of Classification Search
USPC ............ 370/252, 312, 324, 328, 350, 395.62, 370/432, 503–514
See application file for complete search history.

(56) References Cited

U.S. PATENT DOCUMENTS

| | | | |
|---|---|---|---|
| 2009/0080351 A1* | 3/2009 | Ryu et al. ...................... | 370/312 |
| 2009/0103465 A1 | 4/2009 | Chow et al. | |
| 2011/0256883 A1* | 10/2011 | Park et al. .................. | 455/456.1 |

FOREIGN PATENT DOCUMENTS

| | | |
|---|---|---|
| JP | 2011508542 A | 3/2011 |
| KR | 1020050073354 A | 7/2005 |
| KR | 1020100035578 A | 5/2010 |

* cited by examiner

*Primary Examiner* — Dady Chery
(74) *Attorney, Agent, or Firm* — William Park & Associates Patent Ltd.

(57) ABSTRACT

Disclosed are a method and apparatus for determining the number of idle state terminals that determines the number of terminals in an idle state and controls data transmission for a multicast or broadcast service (MBS), and a method of controlling data transmission. The method of determining the number of idle state terminals in the MBS according to the present invention includes: transmitting, by a transmitter, a base station signal for verifying the number of idle state terminals; determining whether a radio terminal signal transmitted from an idle state terminal using the base station signal is present, or a the number of radio terminal signal types; and determining the number of idle state terminals based on whether the radio terminal signal is present or the number of radio terminal signal types.

20 Claims, 6 Drawing Sheets

METHOD AND APPARATUS FOR DETERMINING NUMBER OF IDLE STATE TERMINALS AND METHOD FOR CONTROLLING DATA TRANSMISSION USING THE SAME

CROSS-REFERENCE TO RELATED APPLICATIONS

This application claims priority to and the benefit of Korean Patent Application No. 10-2012-0020164 filed in the Korean Intellectual Property Office on Feb. 28, 2012, the entire contents of which are incorporated herein by reference.

TECHNICAL FIELD

The present invention relates to a method and apparatus for determining the number of idle state terminals to prevent waste of radio resources in a multicast or broadcast service (MBS), and a method of controlling data transmission. More particularly, the present invention relates to a method and apparatus for determining the number of idle state terminals that determines the number of terminals in an idle state and controls data transmission for an MBS, and a method of controlling data transmission.

BACKGROUND ART

A multicast or broadcast service (MBS) is a service that simultaneously transmits the same content to a plurality of users through single transmission. The MBS provides an efficient mechanism in an aspect of using broadcasting communication resources. While a technology for a wireless access has evolved for a fourth generation in mobile communication, the MBS is currently evaluated as a key technology. Service contents to be provided through the MBS henceforth and a data amount are expected to exponentially increase.

In a wireless section, the MBS simultaneously provides common content to mobile terminals using the same frequency and time resources. Considering mobility, a plurality of base stations is configured as a single common service zone, thereby decreasing sensitivity to user movement. That is, an MBS user may seamlessly use data of an MBS without a predetermined procedure while the MBS user moves through a plurality of cells. It is possible since the plurality of cells is allocated as a common service region called zone.

To minimize battery consumption, a terminal may shift to an idle state in which a predetermined portion of a radio channel is not decoded. Registration of an idle state terminal is released from a corresponding base station and the idle state terminal freely moves without connecting to a base station. In most MBS mechanisms, correlation between an idle state terminal and a base station is absent. However, a scheme of enabling the idle state terminal to continuously receive MBS data is applied.

One of the important concepts of the MBS is a macro-diversity characteristic. Macro-diversity enables a plurality of base station constituting the same MBS zone to transmit the same data to a terminal at the same point in time, thereby enabling the terminal to receive the same data from the plurality of base stations while the terminal is maintaining time synchronization with each base station. The terminal restores MBS data based on a different synchronization time with each base station. Since the terminal receives the same data from the plurality of base stations, a data decoding gain by macro-diversity is improved.

Figure 1:
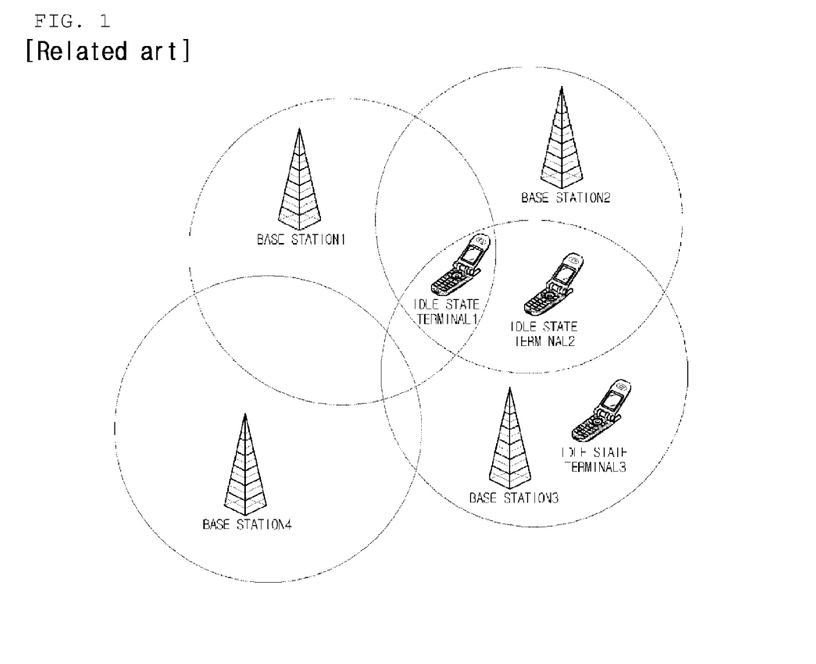
FIG. 1 is a diagram to describe the requisites to determine whether an idle state terminal is present within coverage of a multicast or broadcast service (MBS).

FIG. 1 is a diagram to describe the requisites to determine whether an idle state terminal is present within coverage of a multicast or broadcast service (MBS).

Figure 2:
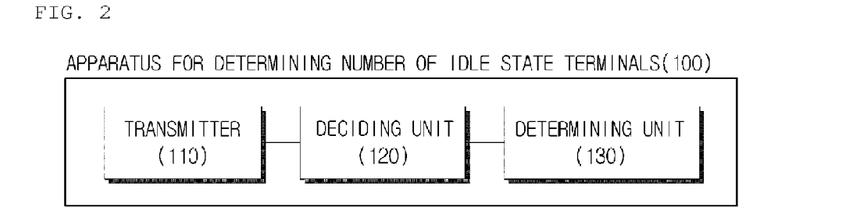
FIG. 2 is a block diagram illustrating an apparatus for determining the number of idle state terminals according to an exemplary embodiment of the present invention.

Referring to FIG. 2, The macro-diversity has disadvantages in a resource allocation aspect. To obtain a macro-diversity gain, all of the base stations belonging to the same zone need to transmit MBS data while using a predetermined amount of radio resources. Even though there is no terminal receiving MBS data from a predetermined base station belonging to a predetermined MBS zone, the corresponding base station may continuously transmit the MBS data. In this case, waste of radio resources occurs. Considering a tendency that an MBS data traffic amount continuously increases, a mechanism for solving the above issue is required.

To solve the above issue, there is a need to accurately verify the number of terminals that are in an idle state, while receiving MBS data. To solve the above issue, the conventional art induces an idle state terminal to be associated with a predetermined base station using a mechanism called paging. An idle state terminal of a macro-diversity operation mode receives MBS data from a plurality of base stations. Therefore, even after a paging process, a base station may arbitrarily perform dynamic resource allocation for corresponding MBS data.

SUMMARY OF THE INVENTION

The present invention has been made in an effort to provide a method and apparatus for determining the number of idle state terminals in order to decrease waste of radio resources by determining the number of idle state terminals in a multicast or broadcast service (MBS) and by controlling a radio resource allocation based on the determined number of idle state terminals.

An exemplary embodiment of the present invention provides a method of determining the number of idle state terminals in an MBS, the method including: transmitting, by a transmitter, a base station signal for verifying the number of idle state terminals; determining whether a radio terminal signal transmitted from an idle state terminal using the base station signal is present, or the number of radio terminal signal types; and determining the number of idle state terminals based on whether the radio terminal signal is present or the number of radio terminal signal types.

The base station signal may have a structure of a radio frame, and the structure of the radio frame may include a ranging region set and a ranging code set.

The ranging region set may be a set of two-dimensional (2D) regions that are divided based on a time axis and a frequency axis.

In the radio terminal signal, the idle state terminal may randomly select a ranging region from the ranging region set, randomly select a ranging code from the ranging code set, and transmit the randomly selected ranging code to the randomly selected ranging region.

The determining of whether the radio terminal signal is present may determine that the radio terminal signal is absent when a detection value of the radio terminal signal in which the selected ranging code is transmitted to the selected ranging region is less than a determination criterion, and may determine that the radio terminal signal is present when the detection value is greater than or equal to the determination criterion.

The determining of the type of radio terminal signal may verify the type of radio terminal signal by receiving the transmitted radio terminal signal and by summing up the number of radio terminal signals having different ranging regions and the number of radio terminal signals having different ranging codes among radio terminal signals having the same ranging region.

The determining of the number of idle state terminals may determine that the idle state terminal is absent when the radio terminal signal is absent, and may determine that at least one idle state terminal is present when the radio terminal signal is present.

The determining of the number of idle state terminals may determine that the number of idle state terminals corresponding to the verified number of radio terminal signal types is present.

An exemplary embodiment of the present invention provides a method of controlling a multicast or broadcast data transmission rate based on whether an idle state terminal is present, the method including: transmitting, by a base station, a base station signal for verifying the number of idle state terminals; determining whether a radio terminal signal transmitted by the idle state terminal using the base station signal is present; determining the number of idle state terminals based on whether the radio terminal signal is present; and continuing, by the base station, multicast or broadcast data transmission when the determined number of idle state terminals is at least one, and suspending the multicast or broadcast data transmission when the determined number of idle state terminals is zero.

The base station signal may have a structure of a radio frame, and the structure of the radio frame may include a ranging region set and a ranging code set.

The determining of whether the radio terminal signal is present may determine that the radio terminal signal is absent when a detection value of the radio terminal signal in which a selected ranging code is transmitted to a selected ranging region is less than a determination criterion, and may determine that the radio terminal signal is present when the detection value is greater than or equal to the determination criterion.

The determining of the number of idle state terminals may determine that the idle state terminal is absent when the radio terminal signal is absent, and may determine that at least one idle state terminal is present when the radio terminal signal is present.

The suspending of the data transmission may suspend the multicast or broadcast data transmission by excluding, from an MBS zone, a base station having suspended the data transmission.

Another exemplary embodiment of the present invention provides an apparatus for determining the number of idle state terminals in an MBS, the apparatus including: a transmitter to transmit a base station signal for verifying the number of idle state terminals; a deciding unit to determine whether a radio terminal signal transmitted from an idle state terminal using the base station signal is present, or the number of radio terminal signal types; and a determining unit to determine the number of idle state terminals based on whether the radio terminal signal is present or the number of radio terminal signal types.

The base station signal may have a structure of a radio frame, and the structure of the radio frame may include a ranging region set and a ranging code set.

In the radio terminal signal, the idle state terminal may randomly select a ranging region from the ranging region set, randomly select a ranging code from the ranging code set, and transmit the randomly selected ranging code to the randomly selected ranging region.

The deciding unit may determine that the radio terminal signal is absent when a detection value of the radio terminal signal in which the selected ranging code is transmitted to the selected ranging region is less than a determination criterion, and may determine that the radio terminal signal is present when the detection value is greater than or equal to the determination criterion.

The deciding unit may verify the number of radio terminal signal types by receiving the transmitted radio terminal signal and by summing up the number of radio terminal signals having different ranging regions and the number of radio terminal signals having different ranging codes among radio terminal signals having the same ranging region.

The determining unit may determine that the idle state terminal is absent when the radio terminal signal is absent, and may determine that at least one idle state terminal is present when the radio terminal signal is present.

The determining unit may determine that the number of idle state terminals corresponding to the verified number of radio terminal signal types is present.

A method and apparatus for determining the number of idle mode terminals and a method of controlling data transmission using the same according to exemplary embodiments of the present invention may determine the number of terminals in an idle state and may prevent a base station from wasting radio resources by controlling data transmission of the base station based on the determined number of terminals. Also, according to exemplary embodiments of the present invention, it is possible to prevent an MBS data traffic amount from increasing, and to secure a quick response delay time by excluding network signaling for paging.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

[related art]

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. In the following description and drawings, like reference numerals refer to like constituent elements and thus, a repeated description will be omitted. Also, when it is determined the detailed description related to a related known function or configuration may make the purpose of the present invention unnecessarily ambiguous in describing the present invention, the detailed description will be omitted here.

FIG. 2 is a block diagram illustrating an apparatus 100 for determining the number of idle state terminals according to an exemplary embodiment of the present invention.

Referring to FIG. 2, the apparatus 100 for determining the number of idle state terminals includes a transmitter 110, a deciding unit 120, and a determining unit 130.

The transmitter 110 transmits a base station signal for verifying the number of idle state terminals. The apparatus 100 for determining the number of idle state terminals may be present within a base station. The base station corresponds to a system that provides multicast or broadcast service (MBS) data for an MBS. Multicast is a technology of transmitting data to a plurality of receivers at a time instead of transmitting data to each of the plurality of receivers. The multicast transfers data to an address of a group in which receivers participate, instead of transferring data to each of the receivers. Accordingly, users having joined a group address may receive data at a time. The multicast enables one side to transmit data and a plurality of users to receive the data. The multicast enables data transmission and reception with a plurality of users at a time and thus, is applied, particularly, when Internet broadcasting and the like transmits multimedia data.

Specifically, to verify the number of idle state terminals within base station service coverage of a base station for a multicast service, a base station for a broadcast service, a base station for a wireless mobile communication service, and the like, the transmitter 110 transmits a base station signal. The base station service coverage indicates coverage in which data for providing an MBS and the like is transmitted to a terminal that desires to be provided with an MBS and the like. Service coverage between different base stations may partially overlap each other. To solve an issue occurring due to movement of an MBS data user, regions of a plurality of base stations may be configured as a single common service zone. In a service zone, a plurality of parameters for an MBS is shared. Therefore, even though a terminal moves to a new base station, there is no need to reconfigure a connection and the terminal may seamlessly receive a multimedia service. Coverage in which signals may be transmitted and received between the transmitter 110 and the idle state terminal may not match the service coverage of the base station. In the case of the coverage in which signals may be transmitted and received between the transmitter 110 and the idle state terminal, it is possible to verify the number of idle state terminals even outside the base station service coverage. A base station signal may be periodically or aperiodically transmitted.

A terminal indicates a portable terminal that provides a packet data service to a portable Internet service subscriber, and may have a low power radio frequency (RF)/intermediate frequency (IF) module and controller function, a function of variably controlling a media access control (MAC) frame according to a service characteristic and a propagation environment, a handover function, an authentication and encryption function, and the like. The terminal may be embedded with an Internet access browser for accessing wireless Internet. In the present invention, the terminal indicates a terminal that has joined an MBS needing bi-directional data transmission. While the terminal is receiving MBS data, the terminal maintains a connected state with the base station and transmits data to the base station. The terminal may be a personal digital assistant (PDA), a hand-held personal computer (PC), a notebook, a smart phone, a multimode-multiband (MM-MB) terminal, and a global system for mobile (GSM) phone, a wideband code division multiple access (WCDMA) phone, a CDMA-2000 phone, a mobile broadband system (MBS) phone, a digital multimedia broadcasting (DMB) phone, and the like that have joined an MBS needing bi-directional data transmission in a wireless communication network including CDMA 2000 1x evolution-data optimized (1xEV-DO), CDMA 2000 1X, WCDMA, wireless local region network (WLAN), and the like.

The smart phone is a terminal in which advantages of a mobile communication terminal and a personal portable terminal are mixed, and indicates a terminal in which functions of the mobile communication terminal and functions of the personal portable terminal, that is, data communication functions such as schedule management, fax transmission and reception, Internet access, and the like, are integrated. Also, the MM-MB terminal indicates a terminal that is embedded with a multi-modem chip to be operable in a portable Internet system and other mobile communication systems (for example, a CDMA2000 system, a WCDMA system, and the like).

In general, an idle state is a state for supporting a terminal to periodically receive downlink multicast or broadcast traffic transmission without registering to a predetermined base station, even though the terminal loiters in a radio link environment including multiple base stations (BSs) over a broad region. The idle state is a state in which the terminal does not decode a predetermined portion of a radio channel to minimize battery consumption. Registration of an idle state terminal is released from a base station and the idle state terminal freely moves without connection to the base station. The idle state terminal does not need to observe requirements according to handover or general MAC operation. Here, the idle state terminal may need to check whether a call is received from the base station at predetermined time intervals. Accordingly, the idle state provides a simple and appropriate scheme capable of informing downlink traffic that is pending with respect to the terminal and removes the wireless interface and network handover traffic from an inactive terminal, thereby reducing overhead of a network and the base station. Also, in the idle state, the terminal may operate based on a discrete period and thereby preserve power and operation resources. The idle state terminal returns all of a connection identifier (CID), a management CID (MCID), and an Internet protocol (IP) address. In an MBS, even the idle state terminal may receive MBS data.

Figure 3:
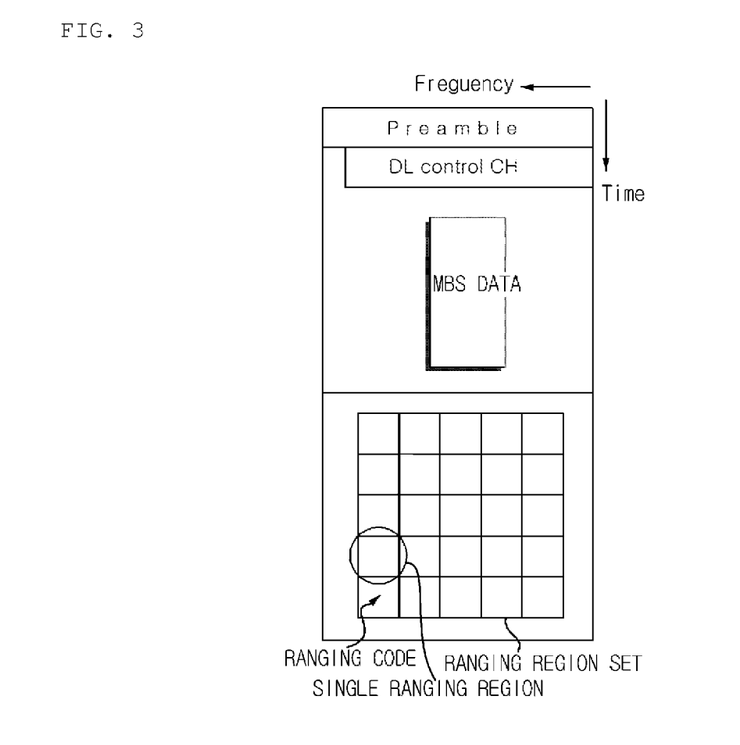
FIG. 3 is an exemplary diagram of a radio frame structure of a base station signal.

FIG. 3 is an exemplary diagram of a radio frame structure of a base station signal.

A base station signal transmitted from the transmitter 110 is, specifically, a radio signal and has a structure of a radio frame. Describing a radio frame structure of the base station signal with reference to FIG. 3, the radio frame structure may include a ranging region set and a ranging code set. More specifically, the radio frame structure may include a preamble, a downlink control channel (DL control CH), MBS data, a ranging region set, and a ranging code set.

The deciding unit 120 determines whether a radio terminal signal transmitted by the idle state terminal using the base station signal is present, or the number of radio terminal signal types.

Figure 4:
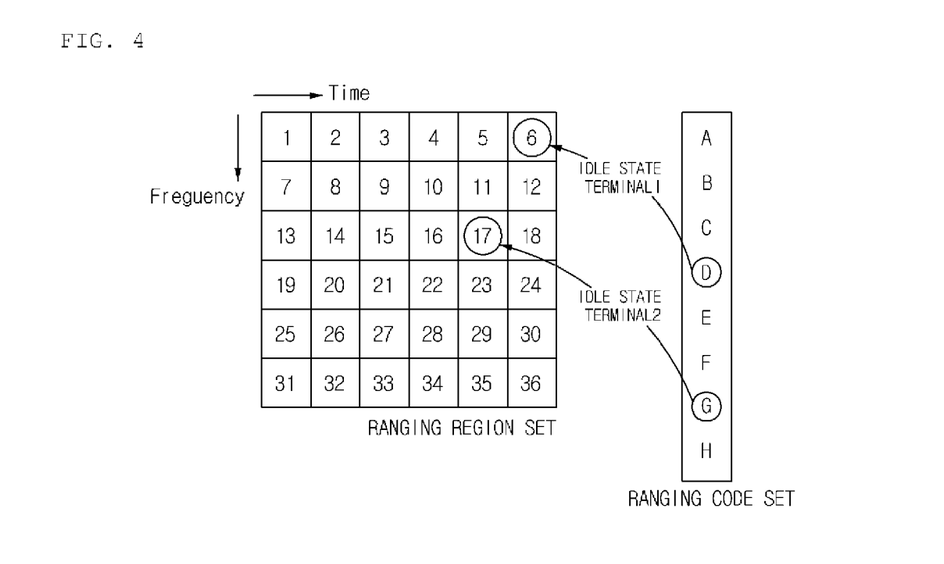
FIG. 4 is an exemplary diagram to describe a method of transmitting, by an idle state terminal, a radio terminal signal using a base station signal.

FIG. 4 is an exemplary diagram to describe a method of transmitting, by an idle state terminal, a radio terminal signal using a base station signal.

Specifically, the radio terminal signal that is transmitted from the idle state terminal using the base station signal will be described with reference to FIG. 4. When the idle state terminal is present, the idle state terminal receives the base station signal transmitted from the transmitter 110 to obtain information about a ranging region set and a ranging code set. The idle state terminal randomly selects a ranging region from the obtained ranging region set. Also, the idle state terminal randomly selects a ranging code from the ranging code set. The radio terminal signal transmitted using the base station signal may be a signal transmitted to the deciding unit 120. In the radio terminal signal, the idle state terminal transmits the randomly selected ranging code using the randomly selected ranging region. For example, referring to FIG. 4, the transmitter 110 transmits a signal to the idle state terminal by including, in a base station signal, information about the ranging region set of 36 ranging regions 1 to 36 and the ranging code set of eight ranging codes A to H. The idle state terminal obtains information about the ranging region set and ranging code set from the base station signal to randomly select a ranging region from 36 ranging regions and to randomly select a ranging code from eight ranging codes. In FIG. 4, an idle state terminal 1 has transmitted a radio terminal signal through the ranging region 6 by selecting the ranging code D, and an idle state terminal 2 has transmitted a radio terminal signal through the ranging region 17 by selecting the ranging code G. Random selection of the ranging region or the ranging code may be performed in a form of random access.

More specifically, the ranging region set may be a set of two-dimensional (2D) regions that are divided based on a time axis and a frequency axis. Describing an exemplary embodiment in which an idle state terminal obtains information about a ranging region set and a ranging code set together with FIG. 3, the transmitter 110 including a base station and the like in an MBS may transmit a signal to match time synchronization with the idle state terminal and the transmitter 110 has a unique preamble. Even in an idle state, a terminal may receive a base station signal. When the idle state terminal receives the base station signal transmitted from the transmitter 110 and detects a preamble, the idle state terminal may verify the transmitter 110 that has transmitted the base station signal. When the idle state terminal detects the preamble, the idle state terminal may receive information about a downlink control channel. When the idle state terminal is capable of receiving information about the downlink control channel, the idle state terminal may obtain information about the ranging region set and the ranging code set included in the base station signal.

Specifically describing in regards to determining whether a radio terminal signal is present, the idle state terminal transmits the radio terminal signal to the deciding unit 120 by transmitting a ranging code randomly selected from the ranging code set to a ranging region randomly selected from the ranging region set. When a detection value of the radio terminal signal is less than a determination criterion, the deciding unit 120 determines that the radio terminal signal is absent. When the detection value of the radio terminal signal is greater than or equal to the determination criterion, the deciding unit 120 determines that the radio terminal signal is present.

The determination criterion indicates a criterion used for determining that the detection value is a radio terminal signal transmitted by an idle state terminal using a base station signal, excluding noise. A criterion value of the determination criterion may be set based on coverage in which the number of idle state terminals is to be determined, and the like.

The detection value of the radio terminal signal may be the strength of a signal calculated by applying a correlation scheme and the like with respect to the radio terminal signal. When a plurality of idle state terminals is present, there may be at least one radio terminal signal.

More specifically, instead of using the correlation scheme, the detection value may be calculated by employing another scheme such as a scheme of using a signal to noise ratio (SNR) and the like. Noise indicates all the electrical signals excluding a mixed input signal while being outputted from an inside or outside of a receiver, an amplifier, and the like.

According to another exemplary embodiment in regards to determining whether a radio terminal signal is present, the transmitter 110 transmits a base station signal by widely providing a ranging region set. Using the base station signal, an idle state terminal transmits a radio terminal signal to the deciding unit 120. The deciding unit 120 performs correlation by summing up all of radio terminal signals transmitted to respective ranging regions and determines whether a radio terminal signal is present by detecting a signal strength value. The ranging region set is widely provided. Therefore, even though a plurality of radio terminal signals is present, a probability that radio terminal signals are transmitted to the same ranging region decreases. Accordingly, an offset probability by overlapping of signals also decreases.

When at least one radio terminal signal is present, a correlation value obtained by summing up all of the radio terminal signals may have a great value compared to a case where there is only noise. Accordingly, when the correlation value has a great value compared to a case where there is only noise, it is determined that at least one radio terminal signal is present. When the correlation value is determined as a value corresponding to a case where there is only noise, it is determined that a radio terminal signal is absent. In addition to the correlation scheme, all of schemes of identifying or detecting a signal in a communication may be employed to determine whether a radio terminal signal is present.

When a single idle state terminal receives a single base station signal to randomly select a ranging region and a ranging code from a ranging region set and a ranging code set included in the base station signal, respectively, it is normal to select a single region from the ranging region set and to select a single code from the ranging code set. Accordingly, when a single idle state terminal receives a base station signal once, it is normal that the single idle state terminal transmits a single radio terminal signal. In this general case, specifically describing determining the number of radio terminal signal types, the deciding unit 120 receives the radio terminal signal and determines, as the type of radio terminal signal, a type obtained by the number of radio terminal signals having different randomly selected ranging regions and the number of radio terminal signals having different randomly selected ranging codes among radio terminal signals having the same randomly selected ranging region.

Figure 5:
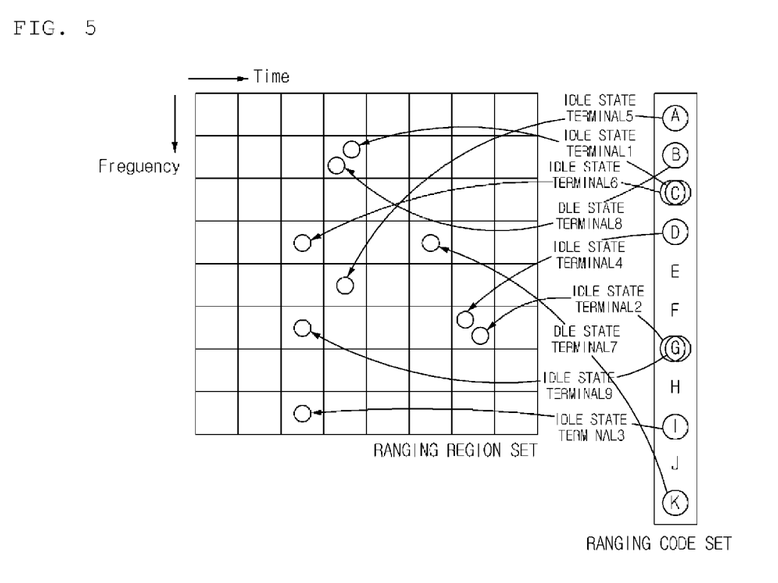
FIG. 5 is an exemplary diagram to describe a method of verifying, by a deciding unit, the number of radio terminal signal types.

For example, referring to FIG. 5, a ranging region set is divided into eight equal parts based on a frequency axis and are divided into eight equal parts based on a time axis whereby a total of 64 ranging regions are present. Each of eight idle state terminals 1 to 9 receives a base station signal to randomly select a ranging region and a ranging code and to thereby transmit the radio terminal signal. During the above process, in each radio terminal signal, there may be a case where the same ranging code is randomly selected and a case where the same ranging region is randomly selected. Unless it is a case where the same ranging code is randomly selected and the same ranging region is randomly selected, each radio terminal signal may be identifiable. Radio terminal signals respectively transmitted from idle state terminals 1 to 9 are using a total of five types of ranging regions. In two cases, two radio terminal signals are transmitted to the same ranging region. Here, in one case, randomly selected ranging codes are B and C and thus, are different from each other. In another case, randomly selected ranging codes are D and G and thus, are different from each other. Accordingly, in FIG. 5, "9" obtained by summing up the number of types "7" in which the randomly selected ranging codes are different from each other and the number of types "2" in which the same ranging region is randomly selected, but the randomly selected ranging codes are different from each other is determined as the number of radio terminal signal types.

The determining unit 130 determines the number of idle state terminals based on whether a radio terminal signal is present or the number of radio terminal signal types.

Specifically, when it is determined that the radio terminal signal is absent, is the determining unit 130 determines that the idle state terminal is absent. When it is determined that the radio terminal signal is present, the determining unit 130 determines that at least one idle state terminal is present. The number of idle state terminals is determined to be equal to the number of radio terminal signal types. When each of different idle state terminals receives the same base station signal to select the same ranging region and the same ranging code, an error may occur. The transmitter 110 may decrease an error occurrence probability by widely setting the ranging region set included in the base station signal.

Using a method of determining the number of idle state terminals according to the present invention, an MBS base station may be aware of whether an idle state terminal is present within base station service coverage. In the case of a connected terminal within the MBS base station service coverage, a base station and a terminal are connected and thus, the number of connected terminals may be accurately verified. When there is no connected terminal within the base station service coverage and no idle state terminal, the base station may suspend MBS data transmission, thereby preventing waste of radio resources. When an idle state terminal is determined to be absent within base station service coverage using a method of determining the number of idle state terminals according to the present invention, the base station does not need to allocate radio resources for MBS data transmission, which may prevent an MBS data traffic amount from increasing. Also, by excluding network signaling called paging, it is possible to secure a quick response delay time.

Figure 6:
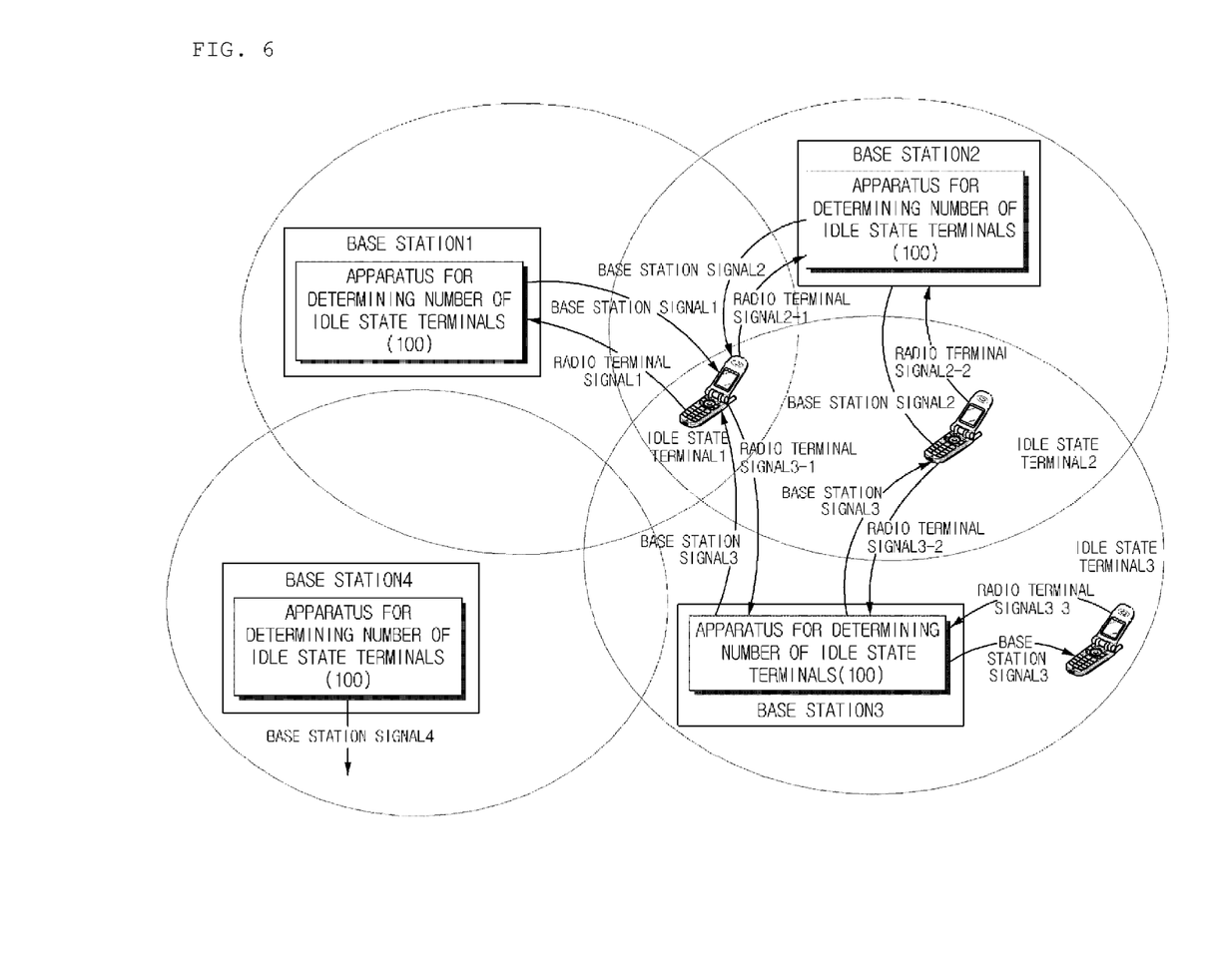
FIG. 6 is an exemplary diagram of a system applying an apparatus for determining the number of idle state terminals according to an exemplary embodiment of the present invention.

FIG. 6 is an exemplary diagram of a system applying an apparatus for determining the number of idle state terminals according to an exemplary embodiment of the present invention.

The apparatus 100 for determining the number of idle state terminals may be included in a base station system. When an idle state terminal is present within service coverage, the idle state terminal receives a transmitted base station signal to transmit the received radio terminal signal. The idle state terminal may receive an MBS from a plurality of base stations.

When the idle state terminal receives the MBS from the plurality of base stations, the idle state terminal receives a base station signal transmitted from the transmitter 110 of the apparatus 100 for determining the number of idle state terminals, included in each base station system that provides a service to the idle state terminal. The idle state terminal enables the presence of the idle state terminal within each base station service coverage to be recognized by receiving base station signals and by transmitting a radio terminal signal with respect to each base station signal. In general, each base station has a unique ranging code. Accordingly, a ranging code set included in a base station signal transmitted from the transmitter 110 is different for each apparatus 100 for determining the number of idle state terminals of each base station. Since the ranging code set is different, the radio terminal signal that is transmitted in response to the base station signal transmitted from the transmitter 110 of a predetermined apparatus 100 for determining the number of idle state terminals is not used for determination of another apparatus 100 for determining the number of idle state terminals.

For example, referring to FIG. 6, each circle is service coverage of each base station. An idle state terminal 1 may receive, from base stations 1, 2, and 3, a mobile communication service including an MBS. The idle state terminal 1 receives base station signals 1, 2, and 3 from the transmitters 110 of the apparatuses 100 for determining the number of idle state terminals that are included in the base stations 1, 2, and 3, respectively. Using the respective base station signals 1, 2, and 3, the idle state terminal 1 transmits radio terminal signals 1, 2, and 3. Each of the base station signals 1, 2, and 3 has a different ranging code set. Therefore, the apparatus 100 for determining the number of idle state terminals included in the base station 1 may receive the radio terminal signal 1 and may not receive the radio terminal signals 2 and 3. Even though the apparatus 100 for determining the number of idle state terminals receives the radio terminal signals 2 and 3, the received radio terminal signals 2 and 3 are not used to determine the number of idle state terminals.

Three idle state terminals are present within service coverage of the base station 3. When the base station signal 3 is transmitted from the transmitter 110 of the apparatus 100 for determining the number of idle state terminals included in the base station 3, the idle state terminals 1, 2, and 3 present within the service coverage of the base station 3 receive the base station signal 3 and transmit radio terminal signals using the base station signal 3. When the idle state terminals 1, 2, and 3 use the base station signal 3, each of the idle state terminals 1, 2, and 3 randomly selects a ranging region from a ranging region set included in the base station signal 3 and randomly selects a ranging code from a ranging code set. Each idle state terminal transmits a radio terminal signal by transmitting the randomly selected ranging code to the randomly selected ranging region. Since a probability that random selections are different from each other is high, the radio terminal signals transmitted from the idle state terminals 1, 2, and 3 may be different from each other.

Referring to FIG. 6, it can be seen that the idle state terminals 1, 2, and 3 use the same base station signal 3, but transmit radio terminal signals 3-1, 3-2, and 3-3 having different ranging regions or ranging codes. Due to a probability that the same ranging region and the same ranging code may be selected, an error may occur in verifying the number of terminals. A probable occurrence error may be reduced by widening the ranging region and by decreasing a probability that the same ranging region may be selected.

In the case of a base station 4, a base station signal 4 is transmitted from the transmitter 110 of the apparatus 100 for determining the number of idle state terminals present in the base station 4, but in response thereto, there is no radio terminal signal. Accordingly, no idle state terminal is present within service coverage of the base station 4. The base station 4 does not need to allocate radio resources for providing a service and thus, may prevent waste of radio resources by suspending data transmission.

Figure 7:
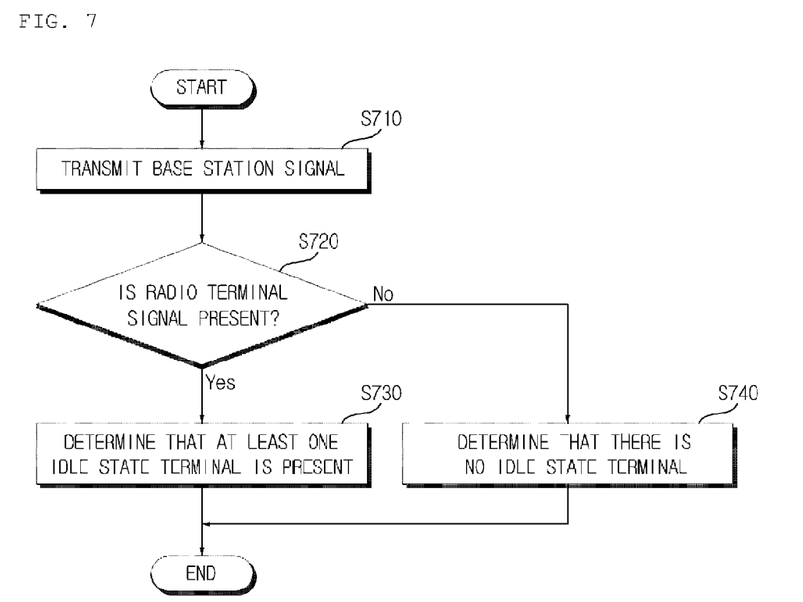
FIG. 7 is a flowchart illustrating a method of determining the number of idle state terminals according to an exemplary embodiment of the present invention.
Figure 8:
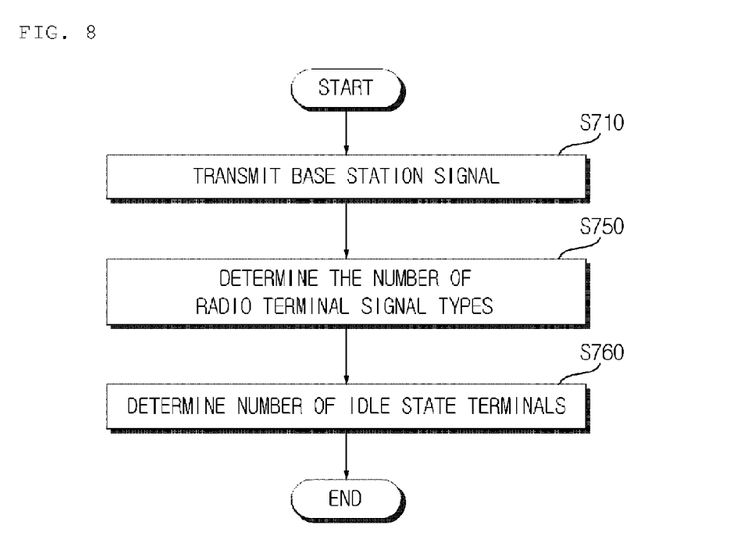
FIG. 8 is a flowchart illustrating a method of determining the number of idle state terminals according to the other exemplary embodiment of the present invention.

A method of determining the number of idle state terminals will be described with reference to FIGS. 7 and 8. FIGS. 7 and 8 are flowcharts illustrating a method of determining the number of idle state terminals according to an exemplary embodiment of the present invention. Specifically, FIG. 7 is a flowchart to describe a method of determining the number of idle state terminals based on whether a radio terminal signal is present, and FIG. 8 is a flowchart to describe a method of determining the number of idle state terminals based on the number of radio terminal signal types.

As shown in FIG. 7, the transmitter 110 transmits a base station signal (step S710). An idle state terminal receives the base station signal transmitted from the transmitter 110. The idle state terminal receives the base station signal to obtain information about a ranging region set and a ranging code set, and to transmit a radio terminal signal using the obtained information. The deciding unit 120 determines whether the radio terminal signal transmitted by the idle state terminal is present (step S720).

When the deciding unit 120 determines that the radio terminal signal is present, the determining unit 130 determines that at least one idle state terminal state is present (step S730). When the deciding unit 120 determines that the radio terminal signal is absent, the determining unit 130 determines that there is no idle state terminal (step S740).

As shown in FIG. 8, the deciding unit 120 may determine the number of radio terminal signal types (step S750). The determining unit 130 determines the number of idle state terminals based on the number of radio terminal signal types (step S760).

Figure 9:
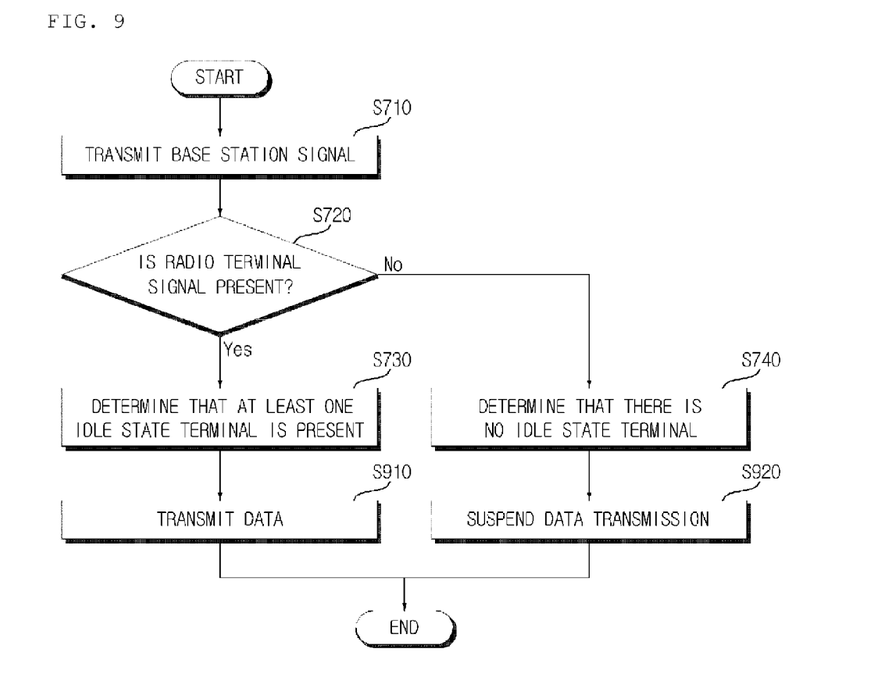
FIG. 9 is a flowchart illustrating a method of controlling data transmission according to an exemplary embodiment of the present invention.

FIG. 9 is a flowchart illustrating a method of controlling data transmission according to an exemplary embodiment of the present invention.

The apparatus 100 for determining the number of idle state terminals according to the present invention determines the number of idle state terminals present within service coverage of each base station for providing a service in a wireless mobile communication service including a multicast service or a broadcast service.

When at least one idle state terminal is present (step S730), the apparatus 100 for determining the number of idle state terminals needs to provide a wireless mobile communication service and thus, transmits data without suspending data transmission (step S910). When there is no terminal connected to a base station of a wireless mobile communication service and there is no idle state terminal (step S740), there is no terminal to receive data transmitted from the base station and thus, the base station suspends data transmission (step S920).

That the base station suspends data transmission indicates that the base station does not allocate radio resources for a service that desires to suspend the data transmission. Specifically, a base station in which there is no connected terminal within service coverage of the base station and there is no idle state terminal may be excluded from an MBS zone through network signaling. Instead of being excluded from the MBS zone, when a terminal desiring to receive a service occurs while the base station is suspending only data transmission for the service, the base station may also transmit data.

A method of controlling data transmission according to the present invention may decrease waste of radio resources in a wireless mobile communication service including an MBS and the like, and may prevent an MBS data traffic amount from increasing.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of determining the number of idle state terminals in a multicast or broadcast service (MBS), the method comprising:
   transmitting, by a transmitter, a base station signal for verifying the number of idle state terminals;
   determining whether or not a radio terminal signal, which is transmitted from an idle state terminal, is present or the number of types of the radio terminal signal using the base station signal; and
   determining the number of idle state terminals based on whether the radio terminal signal is present or the number of radio terminal signal types.

2. The method of claim 1, wherein the base station signal has a structure of a radio frame, and the structure of the radio frame includes a ranging region set and a ranging code set.

3. The method of claim 2, wherein the ranging region set is a set of two-dimensional (2D) regions that are divided based on a time axis and a frequency axis.

4. The method of claim 2, wherein, in the radio terminal signal, the idle state terminal randomly selects a ranging region from the ranging region set, randomly selects a ranging code from the ranging code set, and transmits the randomly selected ranging code using the randomly selected ranging region.

5. The method of claim 4, wherein the determining of whether the radio terminal signal is present determines that the radio terminal signal is absent when a detection value of the radio terminal signal in which the selected ranging code is transmitted to the selected ranging region is less than a determination criterion, and determines that the radio terminal signal is present when the detection value is greater than or equal to the determination criterion.

6. The method of claim 4, wherein the determining of the number of radio terminal signal types verifies the number of radio terminal signal types by receiving the transmitted radio terminal and by summing up the number of radio terminal signals having different ranging regions and the number of radio terminal signals having different ranging codes among radio terminal signals having the same ranging region.

7. The method of claim 5, wherein the determining of the number of idle state terminals determines that the idle state terminal is absent when the radio terminal signal is absent, and determines that at least one idle state terminal is present when the radio terminal signal is present.

8. The method of claim 6, wherein the determining of the number of idle state terminals determines that the number of idle state terminals corresponding to the verified number of radio terminal signal types is present.

9. A method of controlling a multicast or broadcast data transmission rate based on whether an idle state terminal is present, the method comprising:
    transmitting, by a base station, a base station signal for verifying the number of idle state terminals;
    determining whether a radio terminal signal transmitted by the idle state terminal is present using the base station signal;
    determining the number of idle state terminals based on whether the radio terminal signal is present; and
    continuing, by the base station, multicast or broadcast data transmission when the determined number of idle state terminals is at least one, and suspending the multicast or broadcast data transmission when the determined number of idle state terminals is zero.

10. The method of claim 9, wherein the base station signal has a structure of a radio frame, and the structure of the radio frame includes a ranging region set and a ranging code set.

11. The method of claim 10, wherein the determining of whether the radio terminal signal is present determines that the radio terminal signal is absent when a detection value of the radio terminal signal in which a selected ranging code is transmitted to a selected ranging region is less than a determination criterion, and determines that the radio terminal signal is present when the detection value is greater than or equal to the determination criterion.

12. The method of claim 11, wherein the determining of the number of idle state terminals determines that the idle state terminal is absent when the radio terminal signal is absent, and determines that at least one idle state terminal is present when the radio terminal signal is present.

13. The method of claim 9, wherein the suspending of the data transmission suspends the multicast or broadcast data transmission by excluding, from an MBS zone, a base station having suspended the data transmission.

14. An apparatus for determining the number of idle state terminals in an MBS, the apparatus comprising:
    a transmitter to transmit a base station signal for verifying the number of idle state terminals;
    a deciding unit to determine whether or not a radio terminal signal, which is transmitted from an idle state terminal, is present or the number of types of the radio terminal signal using the base station signal; and
    a determining unit to determine the number of idle state terminals based on whether the radio terminal signal is present or the number of radio terminal signal types.

15. The apparatus of claim 14, wherein the base station signal has a structure of a radio frame, and the structure of the radio frame includes a ranging region set and a ranging code set.

16. The apparatus of claim 15, wherein, in the radio terminal signal, the idle state terminal randomly selects a ranging region from the ranging region set, randomly selects a predetermined ranging code from the ranging code set, and transmits the randomly selected ranging code using the randomly selected ranging region.

17. The apparatus of claim 16, wherein the deciding unit determines that the radio terminal signal is absent when a detection value of the radio terminal signal in which the selected ranging code is transmitted to the selected ranging region is less than a determination criterion, and determines that the radio terminal signal is present when the detection value is greater than or equal to the determination criterion.

18. The apparatus of claim 16, wherein the deciding unit verifies the number of radio terminal signal types by receiving the transmitted radio terminals and by summing up the number of radio terminal signals having different ranging regions and the number of radio terminal signals having different ranging codes among radio terminal signals having the same ranging region.

19. The apparatus of claim 17, wherein the determining unit determines that the idle state terminal is absent when the radio terminal signal is absent, and determines that at least one idle state terminal is present when the radio terminal signal is present.

20. The apparatus of claim 18, wherein the determining unit determines that the number of idle state terminals corresponding to the verified number of radio terminal signal types is present.

* * * * *